United States Patent
Sato

(10) Patent No.: US 9,854,204 B2
(45) Date of Patent: Dec. 26, 2017

(54) COMMUNICATION SYSTEM AND METHOD FOR CONTROLLING THE SAME

(71) Applicant: CANON KABUSHIKI KAISHA, Tokyo (JP)

(72) Inventor: Hirochika Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/215,194

(22) Filed: Jul. 20, 2016

(65) Prior Publication Data

US 2017/0034473 A1 Feb. 2, 2017

(30) Foreign Application Priority Data

Jul. 31, 2015 (JP) ................. 2015-152091

(51) Int. Cl.
*H04N 7/14* (2006.01)

(52) U.S. Cl.
CPC ............ *H04N 7/142* (2013.01); *H04N 7/147* (2013.01)

(58) Field of Classification Search
CPC .................................................... H04N 7/142
See application file for complete search history.

(56) References Cited

U.S. PATENT DOCUMENTS

| 8,300,081 | B1* | 10/2012 | Sawyer | H04L 12/1827 348/14.07 |
|---|---|---|---|---|
| 2009/0199078 | A1* | 8/2009 | Caspi | H04L 12/1827 715/202 |
| 2012/0293606 | A1* | 11/2012 | Watson | H04N 5/232 348/14.16 |
| 2013/0050398 | A1* | 2/2013 | Krans | H04N 7/142 348/14.07 |
| 2013/0335508 | A1* | 12/2013 | Mauchly | H04N 5/2628 348/14.08 |
| 2014/0063178 | A1* | 3/2014 | Krans | H04N 7/142 348/14.08 |
| 2015/0009278 | A1* | 1/2015 | Modai | H04N 7/15 348/14.08 |
| 2016/0260236 | A1* | 9/2016 | Fogarty | G06T 3/40 |

FOREIGN PATENT DOCUMENTS

JP 2008-191613 A 8/2008

* cited by examiner

*Primary Examiner* — Stella Woo
(74) *Attorney, Agent, or Firm* — Canon USA, Inc. I.P. Division

(57) ABSTRACT

A communication system includes, a first projection unit configured to project an image on a first projection surface, an imaging unit configured to capture an image of an object positioned in front of the first projection surface, a determination unit configured to determine a processing parameter for image processing to be performed on the object image captured by the imaging unit, based on a distance between the first projection surface and the object, a processing unit configured to perform the image processing on the object image based on the processing parameter determined by the determination unit, and a second projection unit configured to project the object image having undergone the image processing on a second projection surface.

18 Claims, 8 Drawing Sheets

OFFICE 1

OFFICE 2

OFFICE 1

OFFICE 2

OFFICE 1

OFFICE 2

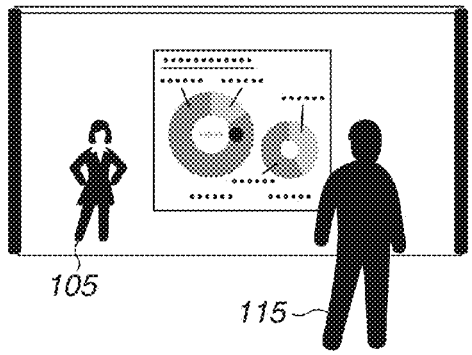
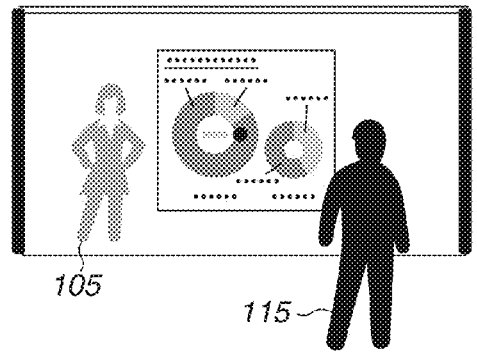
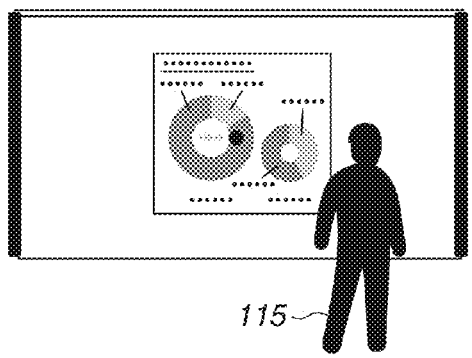
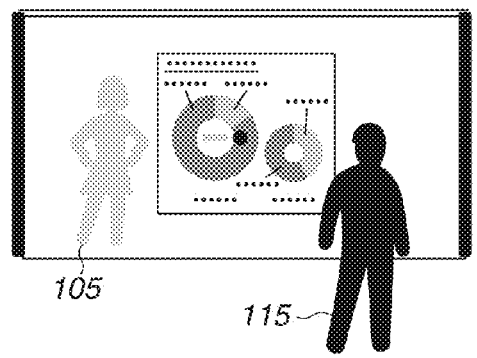
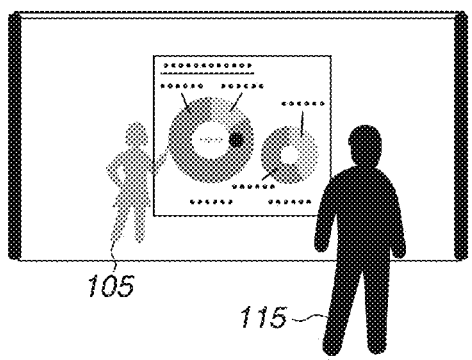

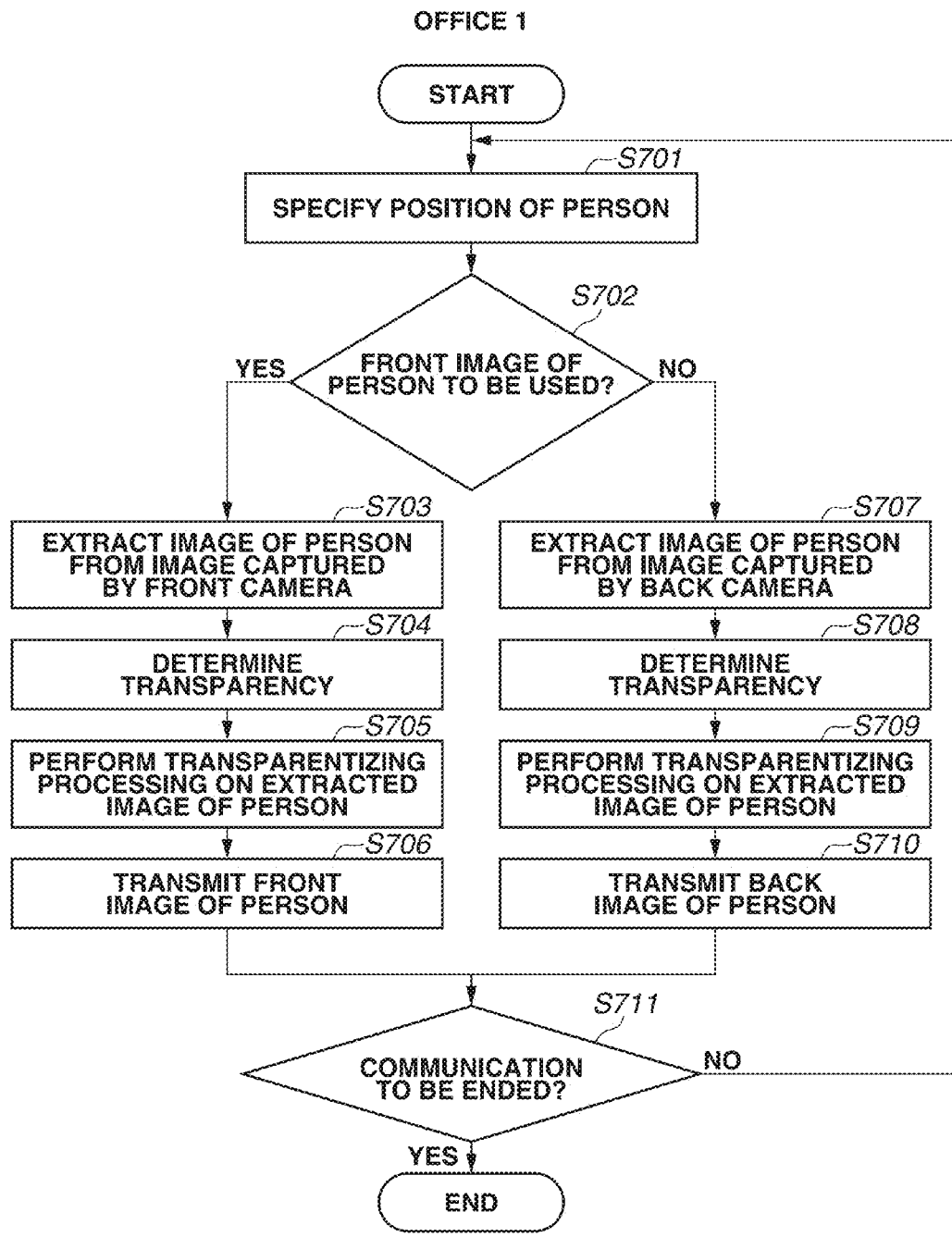

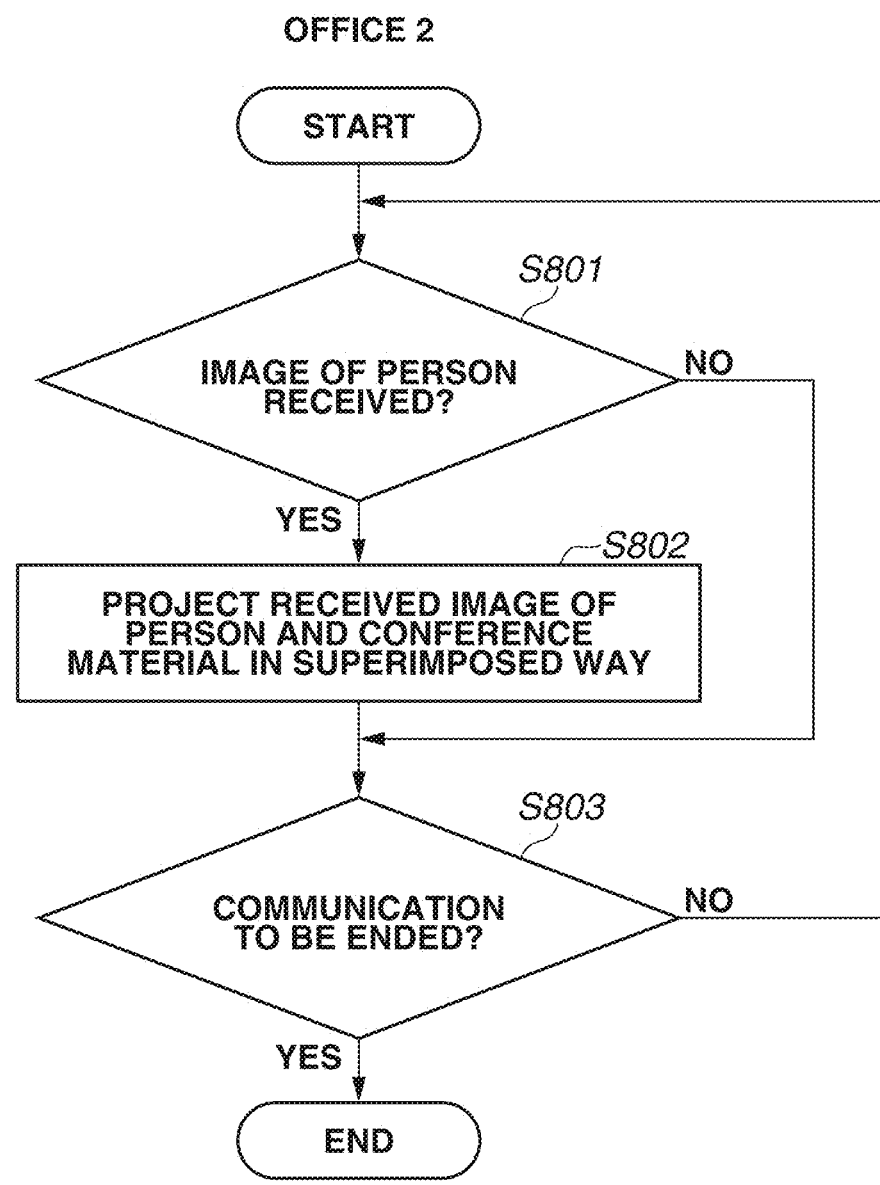

COMMUNICATION SYSTEM AND METHOD FOR CONTROLLING THE SAME

BACKGROUND OF THE INVENTION

Field of the Invention

The present disclosure relates to a communication system for communicating with a communication partner in a remote place.

Description of the Related Art

Some known systems allow a user to communicate with a communication partner in a distant place (remote place). Japanese Patent Application Laid-Open No. 2008-191613 discusses a remote conference system for holding a conference with a communication partner in a remote place. The system discussed in Japanese Patent Application Laid-Open No. 2008-191613 includes a camera for capturing an image of a person, a projector for projecting the captured image, and a screen for displaying the image projected by the projector thereon.

In the system discussed in Japanese Patent Application Laid-Open No. 2008-191613, an image of a person captured by a camera provided in a conference room is projected on a screen by a projector on a partner side (in a remote place) while an image of a person captured by a camera on the partner side is projected on a screen by a projector in the conference room. Japanese Patent Application Laid-Open No. 2008-191613 further discusses a technique for raising a sense of realism in a conference by projecting a person in a life size.

SUMMARY OF THE INVENTION

According to an aspect of the present disclosure, a communication system includes, a first projection unit configured to project an image on a first projection surface, an imaging unit configured to capture an image of an object positioned in front of the first projection surface, a determination unit configured to determine a processing parameter for image processing to be performed on the object image captured by the imaging unit, based on a distance between the first projection surface and the object, a processing unit configured to perform the image processing on the object image based on the processing parameter determined by the determination unit, and a second projection unit configured to project the object image having undergone the image processing on a second projection surface.

According to other aspects of the present disclosure, one or more additional communication systems, one or more methods for controlling same and one or more storage mediums are discussed herein. Further features of the present disclosure will become apparent from the following description of exemplary embodiments with reference to the attached drawings.

BRIEF DESCRIPTION OF THE DRAWINGS

FIGS. 6A, 6B, 6C, 6D, and 6E each illustrate an image of a person projected on a screen in a remote place.

FIG. 7 is a flowchart illustrating processing performed by a control server.

FIG. 8 is a flowchart illustrating processing performed by a control server in a remote place.

DESCRIPTION OF THE EMBODIMENTS

An exemplary embodiment of the present disclosure will be described below with reference to the accompanying drawings. The following exemplary embodiments do not limit the scope of the present disclosure according to the appended claims. Not all of the combinations of the features described in the exemplary embodiments are essential to the solutions for the present disclosure.

Figure 1A:
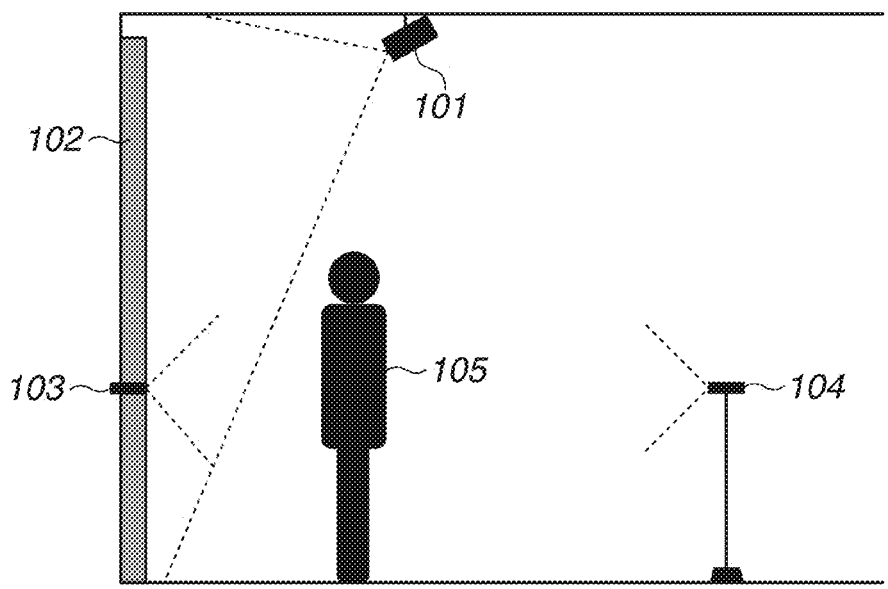
FIGS. 1A and 1B each illustrate a configuration of a communication system.
Figure 1B:
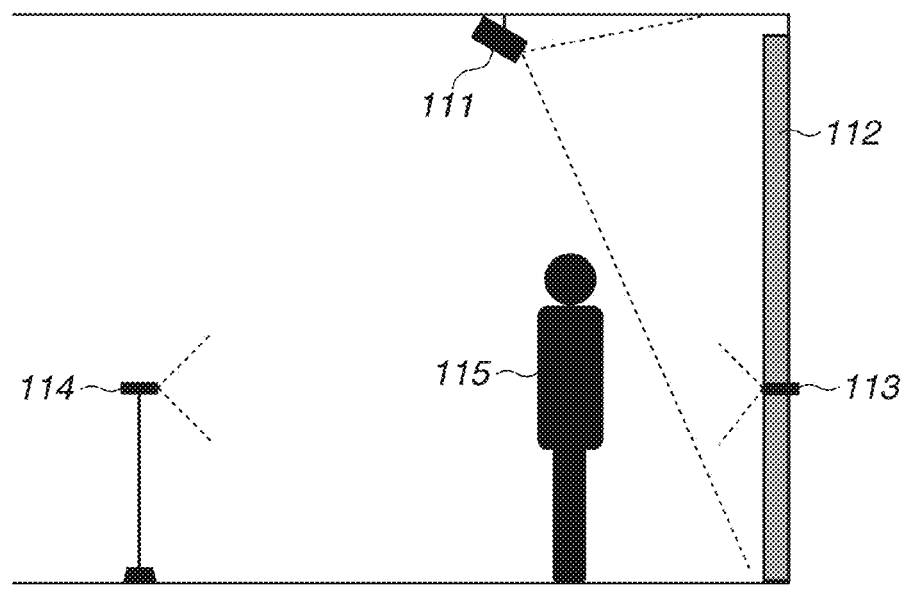

A first exemplary embodiment of the present disclosure will be described below. FIGS. 1A and 1B are sectional views each illustrating a communication system according to the present disclosure. Using this communication system enables performing communication between an office 1 (e.g., a head office) and an office 2 (e.g., a branch). Although communication is performed between two offices in this example, communication may be performed between three or more offices.

The above-described offices may be distant from each other so that movement from one office to the other office takes several hours or may be different conference rooms in the same building. More specifically, the expression "remote" indicates different physical spaces, and does not define the physical distance or the length of time taken to move from one place to another.

The office 1 illustrated in FIG. 1A is provided with a projector 101, a screen 102, a front camera 103, and a back camera 104. The projector 101 is a projection apparatus for projecting, on the screen 102, an image captured in another office. In the present exemplary embodiment, images captured by the front camera 103 and the back camera 104 and images projected on the screen 102 are assumed to be moving images, but may be still images.

The projector 101 projects, on the screen 102, a conference material and an image of a person in a remote place (e.g., the office 2) in a superimposed way. In the present exemplary embodiment an image is projected on the screen 102 by using one projector. However, a plurality of projectors may be installed, and a conference material and an image of a person in a remote place may be projected by different projectors.

The screen 102 is a projection surface on which an image is projected by the projector 101. The screen 102 may be temporarily installed when communication with a communication partner in another office is performed, and an office wall may serve as the screen 102. Although, in the present exemplary embodiment, a projector and a screen are used to display an image, an image can be displayed by using a large-sized liquid crystal display (LCD).

The front camera 103, an imaging apparatus for capturing an image of a person 105, is embedded in the screen 102. The front camera 103 is a camera for capturing an image of the front of the person 105, who stands in front of the screen 102, from the side of the screen 102 as the projection surface side. The front camera 103 is installed at the position illustrated in FIG. 1A so that the front of the person 105 can be captured when the person 105 faces the screen 102.

The back camera 104 is an imaging apparatus for capturing an image of the person 105. The back camera 104 is a camera for capturing an image of the back of the person 105, who stands in front of the screen 102, and an image projected on the screen 102. The back camera 104 is installed at the position illustrated in FIG. 1A (the side opposite to the screen 102 with respect to the person 105) so that the back of the person 105 can be captured when the person 105 faces the screen 102.

The front camera 103 includes a distance sensor for detecting the distance to an object. Images obtained by the front camera 103 include color images composed of red, green, and blue (RGB) 8-bit 3-channel information and distance images composed of 8-bit 1-channel information. The use of a distance image enables the front camera 103 to measure the distance between the screen 102 and the person 105.

As illustrated in FIG. 1B, the office 2 in which a person 115 is present is also provided with facilities similar to those in the office 1 (a projector 111, a screen 112, a front camera 113, and a back camera 114).

Figure 2A:
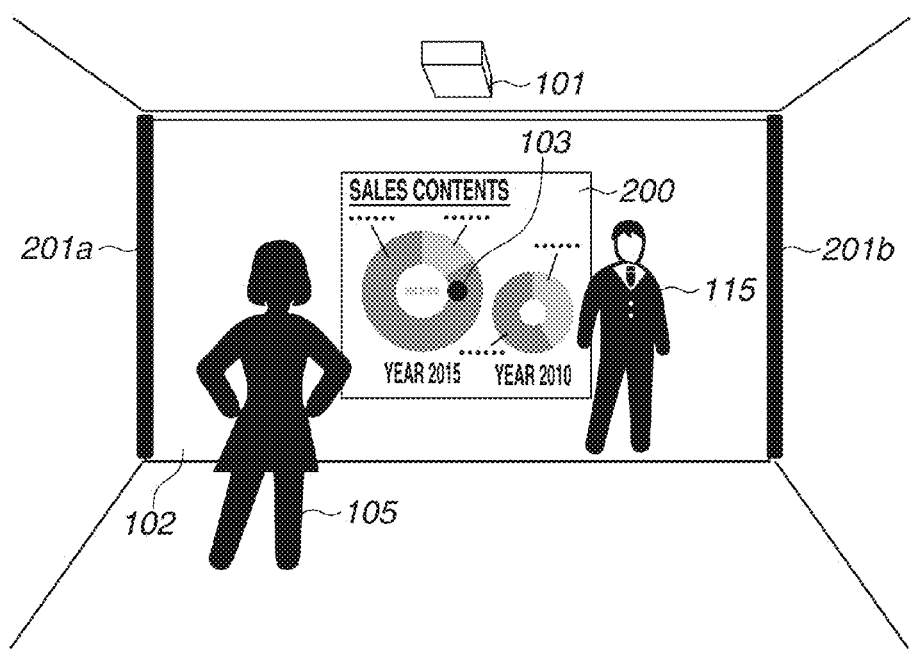
FIGS. 2A and 2B each illustrate a state where communication is performed.

FIG. 2A is an external view illustrating the communication system in which the person 105 in the office 1 is communicating with the person 115 in the office 2. An image of the person 115 captured by the front camera 113 of the office 2 and a conference material 200 are projected on the screen 102.

The office 1 is provided with a digitizer which includes a transmitter 201a and a receiver 201b. The digitizer is a detection apparatus for detecting a user operation performed on the screen 102. When infrared light projected by the transmitter 201a is interrupted by a part of the body of the person 105 or a pointing stick held by the person 105, the digitizer outputs coordinates indicating the position of infrared light interruption. Although, in this example, the transmitter 201a is arranged on the left side of the screen 102 and the receiver 201b is arranged on the right side of the screen 102, these devices may be arranged on the upper and lower sides of the screen 102. The method for detecting a user operation is not limited to a digitizer. A touch-panel function provided on the screen 102 may detect a pressed position on the screen 102.

Figure 2B:
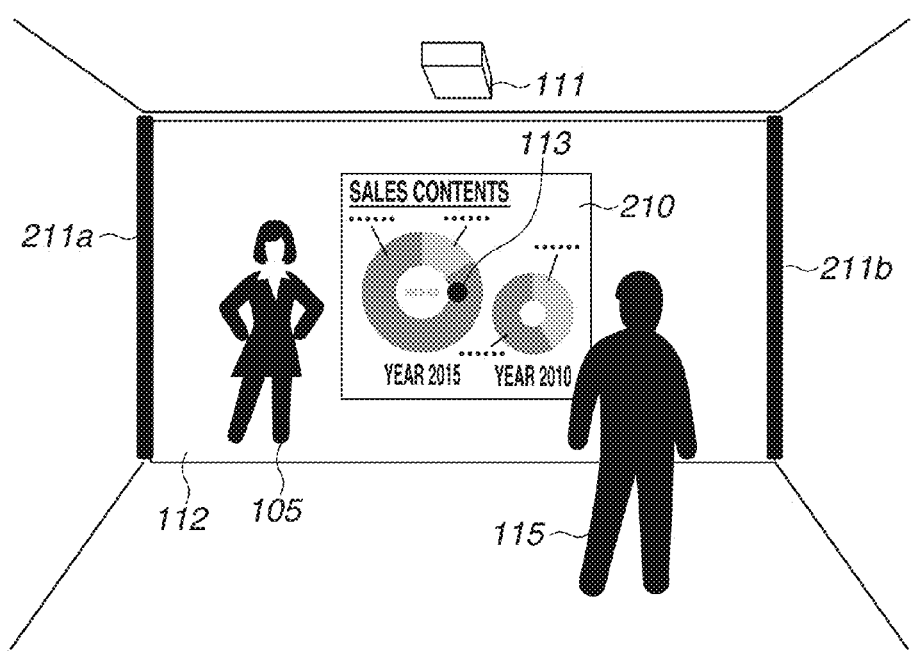

FIG. 2B illustrates a situation in the office 2. An image of the person 105 captured by the front camera 103 of the office 1 and the conference material 210 are projected on the screen 112 of the office 2. As with the office 1, the office 2 is also provided with a digitizer which includes a transmitter 211a and a receiver 211b.

As illustrated in FIGS. 2A and 2B, a person in the office 1 and a person in the office 2 are each projected in the office 2 and the office 2, respectively. This configuration allows the persons 105 and 115 to get a sense of communicating with each other face to face in the same conference room.

In some conferences, a user (conference participant) approaches a conference material and communicates with another user while pointing the conference material with a finger or pointing stick. In such a case, when an image of a person captured by the front camera is projected to a remote place, the user at the remote place is unable to grasp where in the conference material is pointed out. Accordingly, the present exemplary embodiment is characterized in that, when the user is in close proximity to the screen, the image to be projected to the remote place is changed from the image of the person captured by the front camera to an image of the person captured by the back camera. In the following descriptions, an image of a person captured by the front camera is sometimes referred to as a front image of a person and an image of a person captured by the back camera is sometimes referred to as a back image of a person.

Figure 3A:
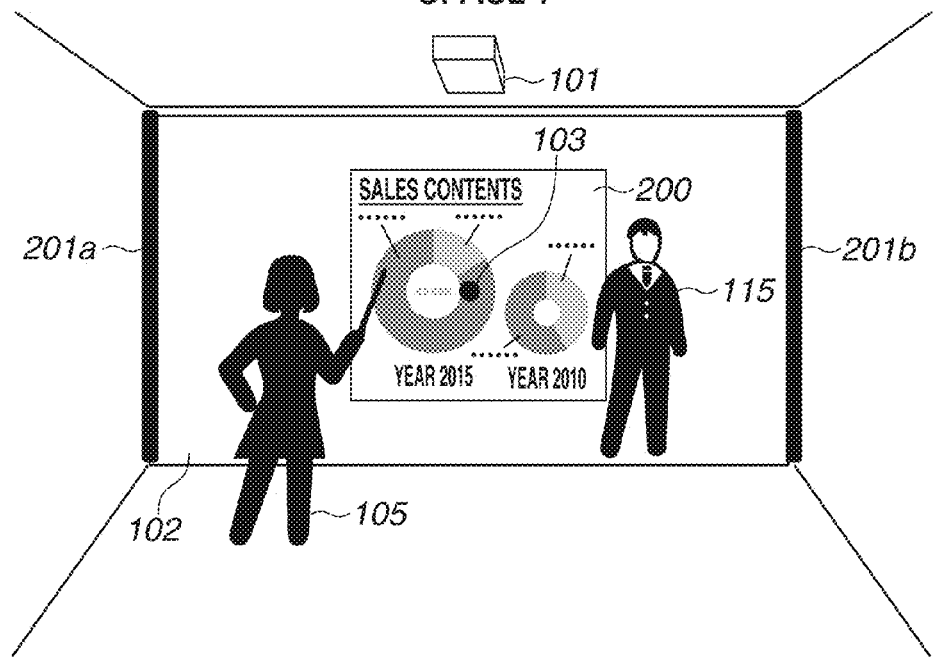
FIGS. 3A and 3B each illustrate a state where communication is performed.

Processing for changing the image to be projected to the remote place from the front image of a person to the back image of the person will be described below with reference to FIGS. 3A and 3B. FIG. 3A illustrates a state where, in the office 1, the person 105 is in close proximity to the screen 102 and points out the conference material with a pointing stick. As compared with the case illustrated in FIG. 2A, the person 105 is closer to the screen 102.

Figure 3B:
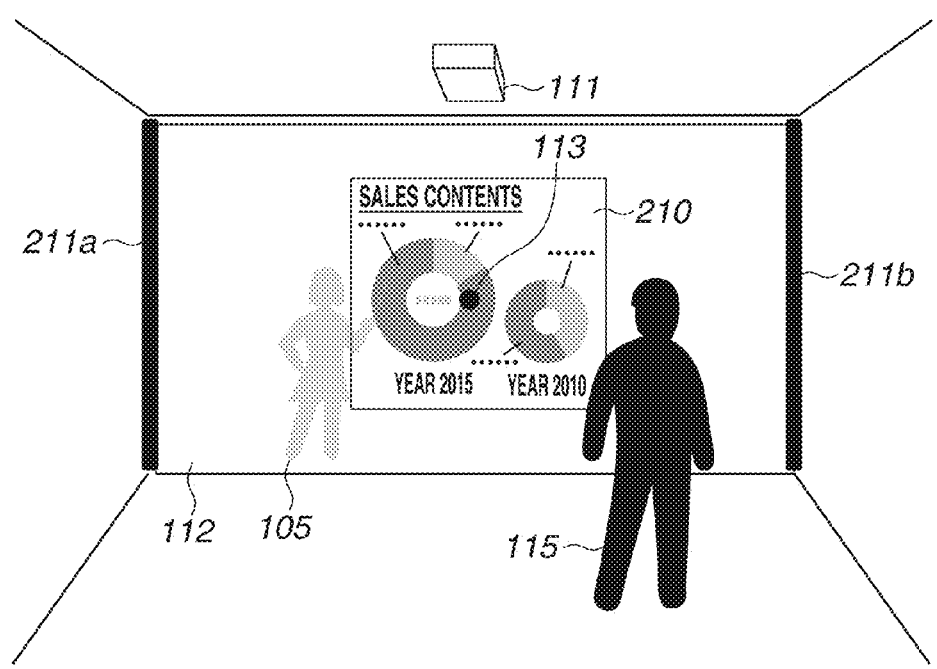

In the office 2, as illustrated in FIG. 3B, the projected image changes from the front image of the image person 105 to the back image of the person 105. With this configuration, the person 115 in the office 2 is able to grasp where in the conference material the person 105 is pointing out with a pointing stick. Further, transparentizing processing is performed on the back image of the person 105 to be projected in the office 2. As a result, even when the back image of the person 105 and the conference material are projected in a superimposed way, the person 115 can grasp the contents of the overlapping portion. The transparentizing processing is an example of image processing.

Figure 4:
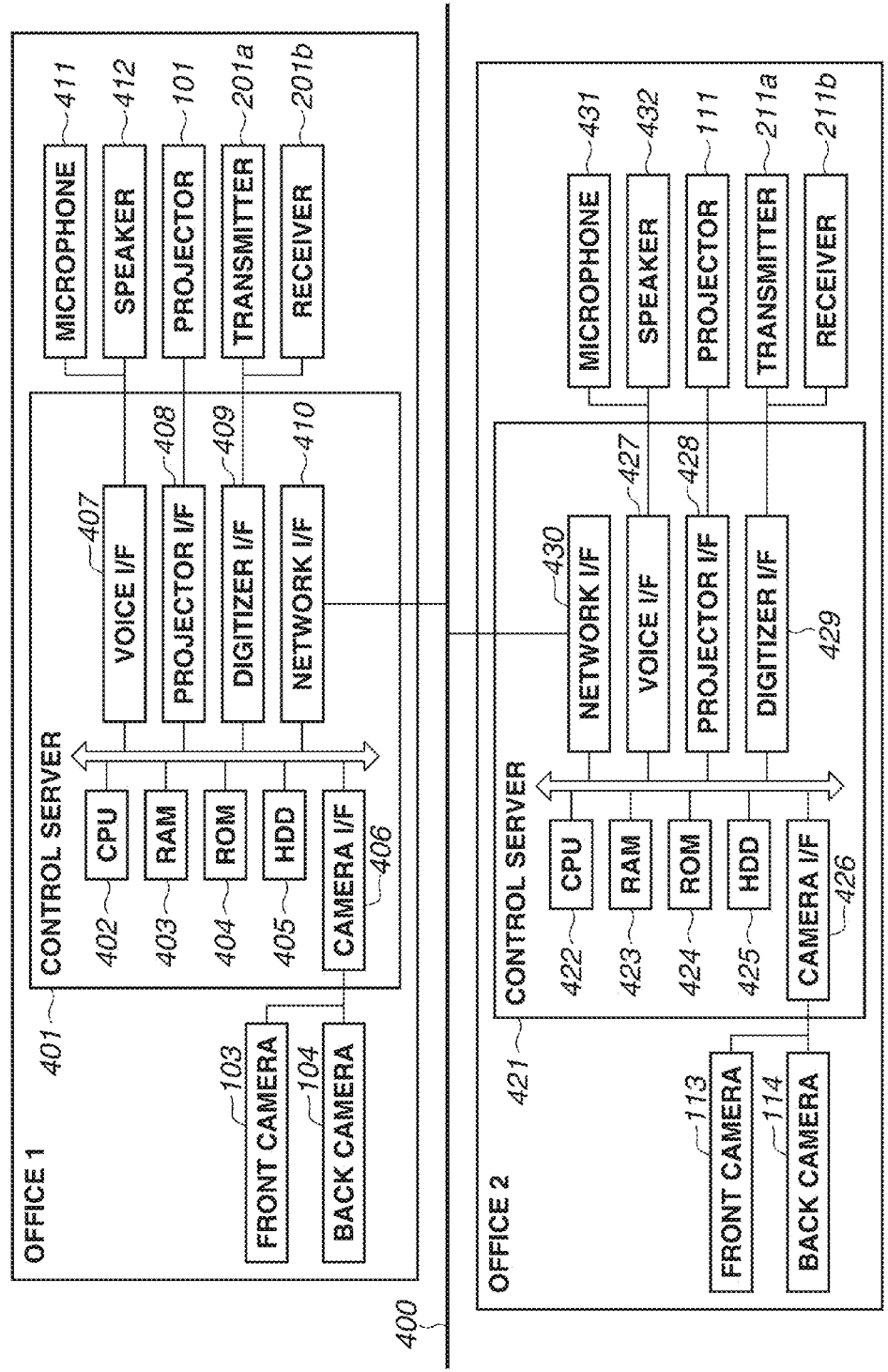
FIG. 4 illustrates a hardware configuration of the communication system.

A hardware configuration of the communication system will be described below with reference to FIG. 4. Although not illustrated in FIGS. 1A, 1B, 2A, 2B, 3A, and 3B, the office 1 is provided with a control server 401. A CPU 402 included in the control server 401 reads a control program stored in a read only memory (ROM) 404 and then executes the control program to control each apparatus provided in the office 1. A random access memory (RAM) 403 is used as a main memory of the CPU 402 and a temporary storage area such as a work area. Although, in the office 1, one CPU (CPU 402) executes each piece of processing illustrated in the flowchart (described below) by using one memory (RAM 403), another configuration is also applicable. For example, a CPU may be provided for each of the cameras, the projector, and the digitizer, and executes each piece of processing in collaboration with a plurality of CPUs, a plurality of RAMs, a hard disk drive (HDD), and a solid state drive (SSD). Further, a part of processing (described below) may be executed by using hardware circuit such as an application specific integrated circuit (ASIC). A HDD 405 is used as a storage medium for storing various data.

A network 400 is a network for connecting the offices 1 and 2. The type of the network 400 is not limited and may be suitably selected according to the user's environment, for example, from a wired network, a wireless network, a wide area network (WAN), a local area network (LAN), a public line, and a private line. A network interface (I/F) 410 is an interface for connecting the office 1 to the network 400.

Although not illustrated in FIGS. 1A, 1B, 2A, 2B, 3A, and 3B, each office is provided with a microphone and a speaker. Voice of a person in an office is converted into an audio signal by a microphone and is output from a speaker in a remote place. The office 1 is provided with a microphone 411 and a speaker 412. An audio I/F 407 is an interface for controlling an audio input to the microphone 411 and an audio output from the speaker 412.

A projector I/F 408 is an interface for controlling image projection performed by the projector 101. Although, in the present exemplary embodiment, an image is projected on a screen by using one projector, an image may be projected on the screen by using a plurality of projectors when the screen has a large width.

A digitizer I/F 409 is an interface for controlling detection of a user operation by the digitizer which includes the transmitter 201a and the receiver 201b. A camera I/F 406 is an interface for controlling image capturing performed by the front camera 103 and the back camera 104.

The office 2 has a hardware configuration similar to that of the office 1. Since each hardware component of the office 2 is similar to that of the office 1, redundant descriptions thereof will be omitted.

Figure 5:
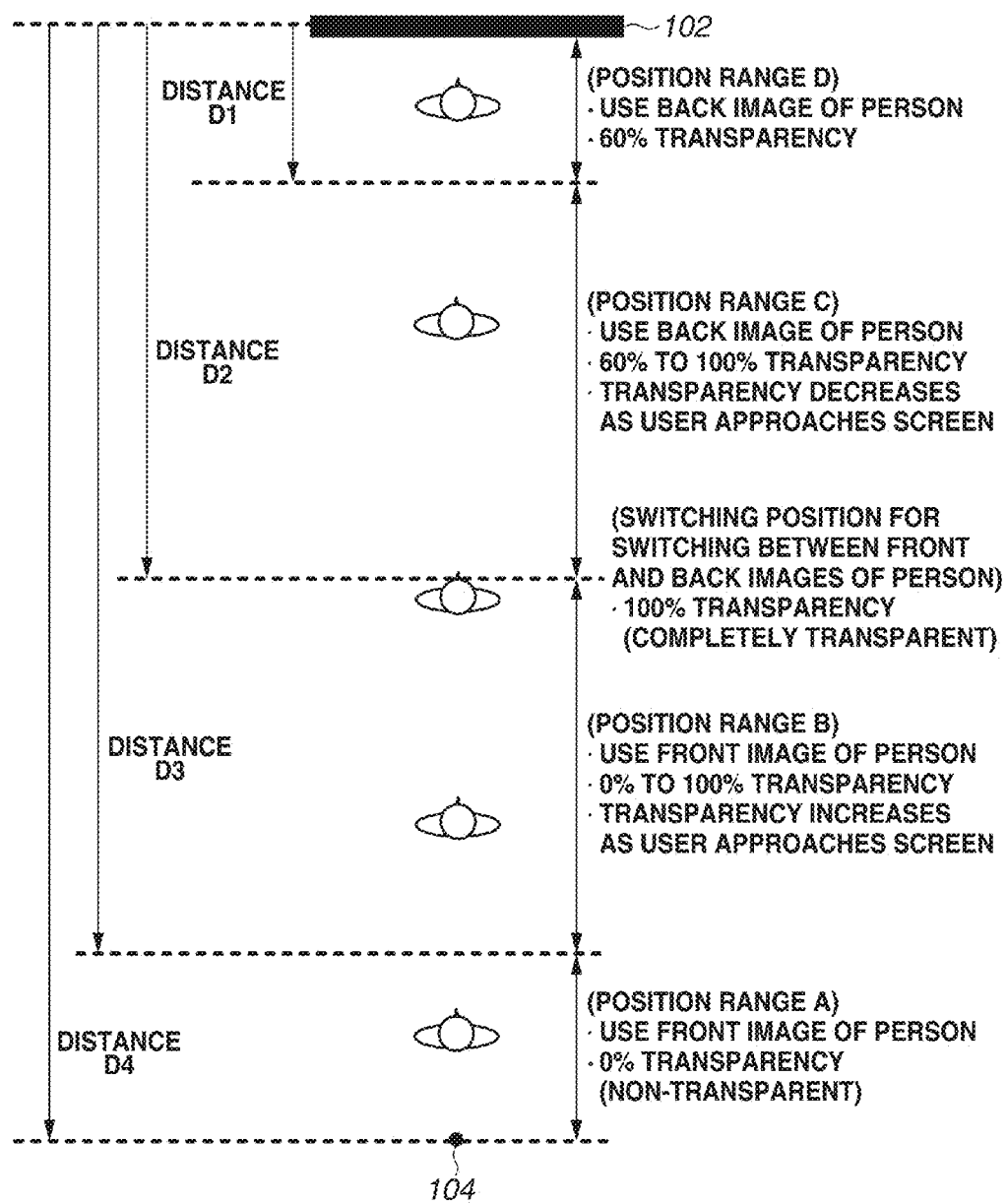
FIG. 5 illustrates switching between a back image of a person and a front image of the person.

The processing for switching between the front and the back images of a person will be described in detail below with reference to FIGS. 5, 6A, 6B, 6C, 6D, and 6E. FIG. 5 illustrates a positional relation between the screen 102 and the person 105 when the office 1 is viewed from above (ceiling side). The front camera 103 is embedded in the screen 102. Thus, the distance between the front camera 103 and the person 105 to be measured by the front camera 103 coincides with the distance between the screen 102 and the person 105. Distances D1, D2, D3, and D4 illustrated in FIG. 5 are predefined as threshold values and stored in the HDD 405 of the control server 401 and a HDD 425 of a control server 421.

When the position of the person 105 is in a position range A (distance D3<distance between the front camera 103 and the person 105≤distance D4), the control server 401 of the office 1 transmits the front image of the person 105 to the office 2. In this case, the front image of the person 105 is transmitted to the office 2 with the degree of transparency of 0% which means that the transparentizing processing is not performed. In the office 2, the projection result is as illustrated in FIG. 6A. The image projected on the screen 112 of the office 2 includes the portrait image of the person 105, allowing the person 115 to communicate with the person 105 face to face. The degree of transparency is an example of a processing parameter for image processing.

When the position of the person 105 is in a position range B (distance D2≤distance between the front camera 103 and the person 105≤distance D3), the control server 401 of the office 1 transmits the front image of the person 105 to the office 2. In this case, the transparentizing processing is performed on the front image of the person 105 based on the degree of transparency determined using the following formula, and the front image of the person 105 is transmitted to the office 2. In the office 2, the projection result is as illustrated in FIG. 6B. Unlike the projection result illustrated in FIG. 6A, the transparentizing processing is performed on the front image of the person 105 illustrated in FIG. 6B. When the position of the person 105 is in the position range B, the degree of transparency of the front image of the person 105 projected in the office 2 increases as the person 105 approaches the screen 102.

$$\text{Degree of Transparency} = \left(1 - \frac{L - \text{Distance } D2}{\text{Distance } D3 - \text{Distance } D2}\right) \times 100 \text{ (unit \%)} \quad \text{[Formula 1]}$$

L denotes the distance between the front camera 103 and the person 105. The position at which the distance between the front camera 103 and the person 105 is the distance D2 is a switching position for switching between the front and the back images of the person 105. When the distance between the front camera 103 and the person 105 is the distance D2, the degree of transparency of the front image of the person 105 becomes 100%, i.e., completely transparent. In the office 2, the projection result is as illustrated in FIG. 6C.

When the position of the person 105 is in a position range C (distance D1≤distance between the front camera 103 and the person 105<distance D2), the control server 401 of the office 1 transmits the back image of the person 105 to the office 2. Unlike the case where the position of the person 105 is the position range A or B, the back image of the person 105, not the front image of the person 105, is transmitted to the office 2. This is because the person 105 is approaching the screen 102 and it is expected that the person 105 performs a certain action on the conference material (e.g., pointing out with a pointing stick). Since switching between the front and the back images of the person 105 is automatically performed, the person 105 and the person 115 are able to smoothly communicate with each other.

When the position of the person 105 is in the position range C, the transparentizing processing is performed on the back image of the person 105 based on the degree of transparency determined by using the following formula and then the back image of the person 105 is transmitted to the office 2. Although, in the example illustrated in FIG. 5, the minimum degree of transparency is set to 60%, the minimum transparency may be another value. In the office 2, the projection result is as illustrated in FIG. 6D. Unlike the projection results illustrated in FIGS. 6A and 6B, the back image of the person 105 is projected on the screen 112 of the office 2. When the position of the person 105 is in the position range C, the degree of transparency of the back portrait image of the person 105 projected on the office 2 decreases as the person 105 approaches the screen 102.

$$\text{Transparency} = \quad \text{[Formula 2]}$$
$$\left\{\frac{100 - \text{Minimum transparency}}{\text{Distance } D2 - \text{Distance } D1} \times (L - \text{Distance } D1)\right\} +$$
$$\text{Minimum transparency (unit \%)}$$

L denotes the distance between the front camera 103 and person 105, and the minimum degree of transparency denotes the degree of transparency in a position range D. Focusing on the switching position for switching between the front and the back images of the person 105, a moment when the image of the person 105 becomes completely transparent occurs while the person 105 is approaching the screen 102. The front image of the person 105 gradually becomes transparent, disappears for a moment, and then changes to the back image of the person 105, so that the person 115 of the office 2 recognize such a change as a smooth image change.

When the position of the person 105 is in the position range D (distance between the front camera 103 and the person 105<distance D1), the control server 401 of the office 1 transmits the back image of the person 105 to the office 2. The degree of transparency of the back image of the person 105 is 60%. In the office 2, the projection result is as illustrated in FIG. 6E. The image projected on the screen 112 of the office 2 is the front image of the person 105. This allows the person 115 to grasp the action of the person 105 performed on the conference material. A transparency of 60% is an example, and may be other values.

Processing performed by the control server 401 of the office 1 will be described below with reference to the flowchart illustrated in FIG. 7. The flowchart illustrated in FIG. 7 indicates processing, performed by the control server 401 of the office 1, for selecting either the front or the back image of a person as an image to be transmitted to the office 2. Each step in the flowchart illustrated in FIG. 7 is processed when the CPU 402 loads a control program stored in a memory such as the ROM 404 into the RAM 403 and then executes the control program.

In step S701, the CPU 402 specifies the position of a person in front of the screen 102 (the person 105 in the present exemplary embodiment). In the present exemplary embodiment, the front camera 103 includes a distance sensor, and the position of the person 105 is specified based on the distance between the front camera 103 and the person 105 measured by the front camera 103. The relation between the distance between the front camera 103 and the person 105 and the position range to be specified is as illustrated in FIG. 5.

In step S702, the CPU 402 determines whether the front image of the person 105 is to be used as an image to be transmitted to the office 2. When the position of the person 105 specified in step S701 is in the position range A or B, the CPU 402 determines to use the front image of the person 105. In other words, the CPU 402 selects the front image of the person 105 as an image to be transmitted to the office 2 (YES in step S702). Then, the processing proceeds to step S703.

On the other hand, when the position of the person 105 specified in step S701 is in the position range C or D, the CPU 402 determines not to use the front image of the person 105. In other words, the CPU 402 selects the back image of the person 105 as an image to be transmitted to the office 2 (NO in step S702). Then, the processing proceeds to step S707.

Step S703 will be described below. In step S703, the CPU 402 extracts an image of the person (person 105) from the image captured by the front camera 103. In the present exemplary embodiment, the CPU 402 acquires a difference image between a prepared background image (an image captured by the front camera 103 in advance when there is no person) and the latest image captured by the front camera 103, and uses the acquired difference image as an image of the person. This method for extracting an image of a person is merely an example, and other method is also applicable.

In step S704, the CPU 402 determines the degree of transparency based on the position of the person 105 specified in step S701. The relation between the position of the person 105 and the degree of transparency is as illustrated in FIG. 5. In step S705, the CPU 402 performs the transparentizing processing on the image of the person 105 extracted in step S703 based on the degree of transparency determined in step S704.

In step S706, the CPU 402 transmits the front image of the person 105 to the office 2. More specifically, the CPU 402 controls the network I/F 410 to transmit the front image of the person 105 to the office 2. The front image of the person 105 transmitted in this case is the image having undergone the transparentizing processing in step S705.

Step S707 will be described below. In step S707, the CPU 402 extracts an image of the person 105 from the image captured by the back camera 104. The method for extracting an image of the person 105 from the captured image is similar to that in step S703.

In step S708, the CPU 402 determines the degree of transparency based on the position of the person 105 specified in step S701. The relation between the position of the person 105 and the degree of transparency is as illustrated in FIG. 5. In step S709, the CPU 402 performs the transparentizing processing on the image of the person 105 extracted in step S707 based on the transparency determined in step S708.

In step S710, the CPU 402 transmits the back image of the person 105 to the office 2. More specifically, the CPU 402 controls the network I/F 410 to transmit the back image of the person 105 to the office 2. The back image of the person 105 transmitted in this case is the image having undergone the transparentizing processing in step S709.

Step S711 will be described below. In step S711, the CPU 402 determines whether communication is to be ended. For example, when a predetermined end operation is performed by the user, the CPU 402 determines to end communication (YES in step S711), then the processing exits the flowchart illustrated in FIG. 7. On the other hand, when the CPU 402 determines not to end communication (NO in step S711), the processing returns to step S701.

Processing performed by the control server 421 of the office 2 will be described below with reference to the flowchart illustrated in FIG. 8. The flowchart illustrated in FIG. 8 indicates processing for projecting an image of the person 105 (the front or the back image of the person 105) received from the office 1 and a conference material on the screen 112 in a superimposed way. Each step in the flowchart illustrated in FIG. 8 is processed when the CPU 422 loads a control program stored in a memory such as the ROM 424 into the RAM 423 and then executes the control program.

In step S801, the CPU 422 determines whether the image of the person 105 (the front or the back image of the person 105) is received from the office 1. When the image of the person 105 is received from the office 1 (YES in step S801), the processing proceeds to step S802. On the other hand, when the image of the person 105 is not received from the office 1 (NO in step S801), the processing proceeds to step S803.

In step S802, the CPU 422 projects the image of the person 105 received in step S801 and the conference material on the screen 112 in a superimposed way. More specifically, the CPU 422 controls the projector 111 to project a combined image of the image of the person 105 and the conference material on the screen 112.

In step S803, the CPU 422 determines whether communication is to be ended. For example, when a predetermined end operation is performed by the user, the CPU 422 determines to end communication (YES in step S803), then the processing exits the flowchart illustrated in FIG. 8. On the other hand, when the CPU 422 determines not to end communication (NO in step S803), the processing returns to step S801.

According to the present exemplary embodiment, it is possible to switch the image to be transmitted to a remote place between the front and the back images of a person based on the position of a person. In particular, the back image of the person is selected when the person is in close proximity to the screen. This allows a user in a remote place to easily grasp the person's action performed on the conference material. The switching between the front and the back images of the person is automatically performed based on the position of the person, making it possible to reduce user's works and promote smooth communication.

According to the present exemplary embodiment, the transparentizing processing is performed on an image of a person to be projected on a remote place. Even when the conference material and the person are projected in a superimposed way, the transparent image of the person allows a user in a remote place to easily grasp the contents of the overlapping portion.

According to the present exemplary embodiment, when the switching between the front and the back images of a person occurs, the image of the person becomes completely transparent at a certain timing. The front image of the person gradually becomes transparent, disappears for a moment, and changes to the back image of the person. As a result, a user at a remote place can recognize the switching as a smooth image change.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-152091, filed Jul. 31, 2015, which is hereby incorporated by reference herein in its entirety.

What is claimed is:

1. A communication system comprising:
  a first projection unit configured to project an image on a first projection surface;
  a first imaging unit disposed on or in the first projection surface and configured to capture an image of an object positioned in front of the first projection surface;
  a second imaging unit spaced away from, and directed or facing towards, the first projection surface and configured to capture another image of the object;
  a determination unit configured to: (i) determine a processing parameter for image processing to be performed on the object image captured by the first imaging unit or on the another object image captured by the second imaging unit, by comparing a distance between the first projection surface and the object to at least one predetermined distance threshold, and (ii) determine whether to perform the image processing on the object image or on the another object image by comparing the distance between the first projection surface and the object to the at least one predetermined distance threshold;
  a processing unit configured to perform the image processing on the determined one of the object image or the another object image based on the processing parameter determined by the determination unit; and
  a second projection unit configured to project the object image having undergone the image processing or the another object image having undergone the image processing on a second projection surface.

2. The communication system according to claim 1, wherein the first imaging unit is embedded in the first projection surface.

3. The communication system according to claim 1,
  wherein the image processing is transparentizing processing, and
  wherein the processing parameter is a degree of transparency.

4. The communication system according to claim 3, wherein:
  (i) the at least one predetermined distance threshold comprises a first predetermined distance threshold, a second predetermined distance threshold, a third predetermined distance threshold, and a fourth predetermined distance threshold;
  (ii) in response to the distance being less than or below the first predetermined distance threshold, the determination unit determines that the transparentizing is to be performed on the another object image and the degree of transparency is 60%;
  (iii) in response to the distance being greater than or equal to the first predetermined distance threshold and being less than or below the second predetermined distance threshold, the determination unit determines that the transparentizing is to be performed on the another object image and the degree of transparency is performed in a range of 60% to 100% where the transparency decreases as the object is positioned closer to the first projection surface;
  (iv) in response to the distance being greater than or equal to the second predetermined distance threshold and being less than or below, or equal to, the third predetermined distance threshold, the determination unit determines that the transparentizing is to be performed on the object image and the degree of transparency is performed in a range of 0% to 100% where the transparency increases as the object is positioned closer to the first projection surface; and
  (v) in response to the distance being greater than the third predetermined distance threshold and being less than or below, or equal to, the fourth predetermined distance threshold, the determination unit determines that the transparentizing is to be performed on the object image and the degree of transparency is 0%.

5. The communication system according to claim 4, wherein at least one of:
  (i) in response to the distance being equal to the second predetermined distance threshold, the transparentizing is to be performed on the object image using the degree of transparency of 100%; and
  (ii) in response to the distance being equal to the second predetermined distance threshold, the transparentizing is to be performed on the object image using the degree of transparency of 100% such that the projection on the second projection surface appears to switch between the object image and the another object image as the object crosses over the second predetermined distance threshold.

6. The communication system according to claim 3, wherein the transparentizing is performed such that any superimposition of the object image or the another object image with an image of conference material or information by the second projection unit allows the overlapping portion of the image of the conference material or information to be viewed and not blocked by the overlapping portion of the object image or the another object image.

7. The communication system according to claim 1, wherein at least one of:
   (i) the second imaging unit is positioned in a direction opposite to the direction of the first imaging unit;
   (ii) the first imaging unit is positioned in front of the object;
   (iii) the second imaging unit is positioned behind or in back of the object; and
   (iv) the first imaging unit and the second imaging unit are positioned on opposite sides of the object.

8. The communication system according to claim 1, wherein the first imaging unit includes a distance sensor that operates to determine the distance between the first projection surface and the object.

9. The communication system according to claim 1, wherein the second projection unit further operates to display the image in addition to the object image having undergone the image processing or the another object image having undergone the image processing.

10. The communication system according to claim 1, wherein:
    (i) in response to the distance being less than or below the at least one predetermined distance threshold, the determination unit determines that the processing parameter is to be performed on the another object image; and
    (ii) in response to the distance being greater than or above, or equal to, the at least one predetermined distance threshold, the determination unit determines that the processing parameter is to be performed on the object image.

11. The communication system according to claim 1, wherein the object image is an extracted portion of a larger image captured by the first imaging unit and the another object image is an extracted portion of a larger image captured by the second imaging unit.

12. The communication system according to claim 1, wherein the at least one predetermined distance threshold comprises one distance threshold used for determining the processing parameter and for determining whether to perform the image processing on the object image or on the another object image.

13. The communication system according to claim 1, wherein the at least one predetermined distance threshold comprises at least a first predetermined distance threshold used to determine the processing parameter and a second predetermined distance threshold used to determine whether to perform the image processing on the object image or on the another object image, the at least the first predetermined distance threshold and the second predetermined distance threshold being different from each other.

14. A communication system comprising:
    a projection unit configured to project an image on a projection surface;
    a first imaging unit disposed on or in the projection surface and configured to capture an image of an object positioned in front of the projection surface;
    a second imaging unit spaced away from, and directed or facing towards, the projection surface and configured to capture another image of the object;
    a determination unit configured to: (i) determine a processing parameter for image processing to be performed on the object image captured by the first imaging unit or on the another object image captured by the second imaging unit, by comparing a distance between the projection surface and the object to at least one predetermined distance threshold; and (ii) determine whether to perform the image processing on the object image or on the another object image by comparing the distance between the first projection surface and the object to the at least one predetermined distance threshold;
    a processing unit configured to perform the image processing on the determined one of the object image or the another object image based on the processing parameter determined by the determination unit; and
    a transmission unit configured to transmit the object image having undergone the image processing or the another object image having undergone the image processing to an external apparatus.

15. The communication system according to claim 14, wherein the first imaging unit is embedded in the projection surface.

16. The communication system according to claim 14, wherein the image processing is transparentizing processing, and
    wherein the processing parameter is a degree of transparency.

17. A method for controlling a communication system, the method comprising:
    projecting, as a first projection, an image on a first projection surface;
    capturing, from a position that is on or in the first projection surface, an image of an object positioned in front of the first projection surface;
    capturing, from a position that is spaced away from, and in a direction towards or facing, the first projection surface, another image of the object;
    determining a processing parameter for image processing to be performed on the captured object image or on the captured another object image, by comparing a distance between the first projection surface and the object to at least one predetermined distance threshold;
    determining whether to perform the image processing on the object image or on the another object image by comparing the distance between the first projection surface and the object to the at least one predetermined distance threshold;
    performing the image processing on the determined one of the object image or the another object image based on the determined processing parameter; and
    projecting, as a second projection, the object image having undergone the image processing or the another object image having undergone the image processing on a second projection surface.

18. A method for controlling a communication system, the method comprising:
    projecting an image on a projection surface;
    capturing, from a position that is on or in the first projection surface, an image of an object positioned in front of the projection surface;
    capturing, from a position that is spaced away from, and in a direction towards or facing, the projection surface, another image of the object;
    determining a processing parameter for image processing to be performed on the captured object image or on the captured another object image, by comparing a distance between the projection surface and the object to at least one predetermined distance threshold;

determining whether to perform the image processing on the object image or on the another object image by comparing the distance between the first projection surface and the object to the at least one predetermined distance threshold;

performing the image processing on the determined one of the object image or the another object image based on the determined processing parameter; and transmitting the object image having undergone the image processing or the another object image having undergone the image processing to an external apparatus.

* * * * *